(12) United States Patent
Choi et al.

(10) Patent No.: US 9,612,464 B2
(45) Date of Patent: Apr. 4, 2017

(54) LIQUID CRYSTAL DISPLAY

(71) Applicant: SAMSUNG DISPLAY CO., LTD., Yongin, Gyeonggi-Do (KR)

(72) Inventors: Suk Choi, Seongnam-si (KR); Seung Wook Nam, Cheonan-si (KR); Su Jin Kim, Seoul (KR); Jin Won Kim, Suwon-si (KR); Joo Young Yoon, Suwon-si (KR); Hyeok Jin Lee, Seongnam-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 129 days.

(21) Appl. No.: 14/320,714

(22) Filed: Jul. 1, 2014

(65) Prior Publication Data

US 2015/0002500 A1    Jan. 1, 2015

(30) Foreign Application Priority Data

Jul. 1, 2013    (KR) ........................ 10-2013-0076645

(51) Int. Cl.
*G09G 5/00*    (2006.01)
*G06F 3/038*    (2013.01)
(Continued)

(52) U.S. Cl.
CPC ........ *G02F 1/13306* (2013.01); *G02F 1/1339* (2013.01); *G02F 1/133711* (2013.01);
(Continued)

(58) Field of Classification Search
None
See application file for complete search history.

(56) References Cited

U.S. PATENT DOCUMENTS 7,034,452 B2 *    4/2006    Kim .................... H01L 25/048
                                                                 313/493
7,342,635 B2 *    3/2008    Choi .................... G02F 1/13394
                                                                 349/156
(Continued)

FOREIGN PATENT DOCUMENTS

KR    10-2008-0015561 A    2/2008
KR    10-2011-0024603 A    3/2011
(Continued)

*Primary Examiner* — Kent Chang
*Assistant Examiner* — William Lu
(74) *Attorney, Agent, or Firm* — Lee & Morse P.C.

(57) ABSTRACT

A liquid crystal display includes first and second substrates facing each other, the first and second substrates including facing display areas and peripheral areas around the display areas, a plurality of pixels on the display area of the first substrate, a common voltage applying unit on the peripheral area of the first substrate, a data driving circuit unit on the peripheral area of the first substrate, a data driver connecting line on the peripheral area of the first substrate, the data driver connecting line being positioned between the common voltage applying unit and the display area of the first substrate, and connecting the data driving circuit unit and a data line in the display area, and a sealant between the peripheral areas of the first and second substrates and covering the common voltage applying unit and part of the data driver connecting line.

8 Claims, 13 Drawing Sheets

(51) Int. Cl.
  *G02F 1/133* (2006.01)
  *G09G 3/36* (2006.01)
  *G02F 1/1339* (2006.01)
  *G02F 1/1337* (2006.01)
  *G02F 1/1345* (2006.01)

(52) U.S. Cl.
  CPC ....... G09G 3/3659 (2013.01); *G02F 1/13394* (2013.01); *G02F 1/13454* (2013.01); *G02F 1/133788* (2013.01); *G02F 2201/121* (2013.01); *G09G 2300/0421* (2013.01); *G09G 2300/0426* (2013.01); *G09G 2300/0876* (2013.01)

(56) References Cited

U.S. PATENT DOCUMENTS

| | | |
|---|---|---|
| 7,706,052 B2 | 4/2010 | Kang et al. |
| 8,023,090 B2 | 9/2011 | Yoon et al. |
| 8,294,868 B2 | 10/2012 | Lee |
| 2002/0024621 A1* | 2/2002 | Hirakata ................. G02F 1/141 349/34 |
| 2005/0106768 A1* | 5/2005 | Onozuka ............... H01L 27/146 438/30 |
| 2005/0140290 A1* | 6/2005 | Park .................... H01L 27/3253 313/512 |
| 2007/0046619 A1* | 3/2007 | Sano .................... G09G 3/3406 345/102 |
| 2007/0070284 A1* | 3/2007 | Lee ........................ G02F 1/13394 349/153 |
| 2007/0139600 A1* | 6/2007 | Lee ........................ G02F 1/1339 349/153 |
| 2007/0164954 A1* | 7/2007 | Yang .................... G09G 3/3677 345/88 |
| 2007/0291203 A1* | 12/2007 | Nakahara ............. G02F 1/1339 349/113 |
| 2008/0297450 A1 | 12/2008 | Park et al. |
| 2009/0102824 A1* | 4/2009 | Tanaka ................ G02F 1/134309 345/205 |
| 2010/0157231 A1 | 6/2010 | Jung et al. |
| 2010/0265445 A1* | 10/2010 | Wang ..................... G02F 1/1345 349/139 |
| 2011/0285944 A1 | 11/2011 | Park et al. |
| 2013/0258263 A1* | 10/2013 | Yasukawa ......... G02F 1/134309 349/138 |

FOREIGN PATENT DOCUMENTS

| | | |
|---|---|---|
| KR | 10-1074383 B1 | 10/2011 |
| KR | 10-2012-0088220 A | 8/2012 |

* cited by examiner

LIQUID CRYSTAL DISPLAY

CROSS-REFERENCE TO RELATED APPLICATION

Korean Patent Application No. 10-2013-0076645, filed on Jul. 1, 2013, in the Korean Intellectual Property Office, and entitled: "Liquid Crystal Display," which is incorporated by reference herein in its entirety.

BACKGROUND

1. Field

Embodiments relate to a liquid crystal display.

2. Description of the Related Art

A liquid crystal display, which is a flat panel display, may include two sheets of panels with field generating electrodes and a liquid crystal layer interposed therebetween. The liquid crystal display is a display device which rearranges liquid crystal molecules of the liquid crystal layer by applying voltage to the electrodes to control an amount of transmitted light.

In order to increase a response speed of the liquid crystal display, liquid crystal molecules may be initially aligned so as to have pre-tilts. For example, a pre-polymer polymerized by light, e.g., ultraviolet light, may be used to provide pre-tilts to the liquid crystal molecules, and voltage having a desired magnitude is applied to the field generating electrode. In such an initial alignment method, when the voltage is applied to the field generating electrode through a common voltage applying unit and a data driving circuit unit disposed outside of the display area in which the plurality of pixels is formed, after a common voltage is applied to the common electrode and a data voltage having a predetermined magnitude is applied to the pixel electrode, the common electrode and the pixel electrode are floated and then the liquid crystal layer is exposed.

SUMMARY

Embodiments provide a liquid crystal display capable of preventing deterioration of display quality in outer pixels of a display area by preventing a change in intensity of an electric field applied to a liquid crystal layer of a plurality of pixels during an initial alignment process, thereby preventing pre-tilt angles of liquid crystal molecules of some pixels from being changed.

An exemplary embodiment provides a liquid crystal display having a first substrate and a second substrate facing each other, the first and second substrates including facing display areas and facing peripheral areas around the display areas, a plurality of pixels on the display area of the first substrate, a common voltage applying unit on the peripheral area of the first substrate, a data driving circuit unit on the peripheral area of the first substrate, a data driver connecting line on the peripheral area of the first substrate, the data driver connecting line being positioned between the common voltage applying unit and the display area of the first substrate, and connecting the data driving circuit unit and a data line in the display area, and a sealant between the facing peripheral areas of the first and second substrates, the sealant covering the common voltage applying unit and a part of the data driver connecting line.

The liquid crystal display may further include a first spacer disposed in the peripheral area of the first substrate and disposed on a part of the data driver connecting line.

The liquid crystal display may further include a second spacer disposed in the peripheral area of the second substrate and not overlapped with the first spacer.

The sealant may be overlapped with at least one of the first spacer and the second spacer.

The plurality of pixels may include a plurality of pixel electrodes, and the liquid crystal display may further include a common electrode disposed in the display area of the second substrate, in which the common electrode may be electrically connected with the common voltage applying unit.

The liquid crystal display may further include a lower alignment layer disposed in the display area of the first substrate; an upper alignment layer disposed in the display area of the second substrate; and a liquid crystal layer disposed between the first substrate and the second substrate, in which at least one of the lower alignment layer, the upper alignment layer, and the liquid crystal layer may include a polymerizable material.

The liquid crystal display may further include an auxiliary conductor disposed in the peripheral area of the first substrate, disposed between the common voltage applying unit and the display area, and not overlapped with the data driver connecting line, in which the sealant may cover a part of the auxiliary conductor.

Another exemplary embodiment provides a liquid crystal display having a first substrate and a second substrate facing each other, the first and second substrates including facing display areas and facing peripheral areas around the display areas, a plurality of pixels on the display area of the first substrate, a common voltage applying unit on the peripheral area of the first substrate, a data driving circuit unit on the peripheral area of the first substrate, a data driver connecting line on the peripheral area of the first substrate, the data driver connecting line being positioned between the common voltage applying unit and the display area of the first substrate, and connecting the data driving circuit unit and a data line in the display area, and a sealant between the facing peripheral areas of the first and second substrates, the sealant covering the common voltage applying unit, and an organic layer on the peripheral area of the first substrate and covering a part of the common voltage applying unit and a part of the data driver connecting line.

The liquid crystal display may further include a second spacer disposed in the peripheral area of the second substrate and not overlapped with the organic layer.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
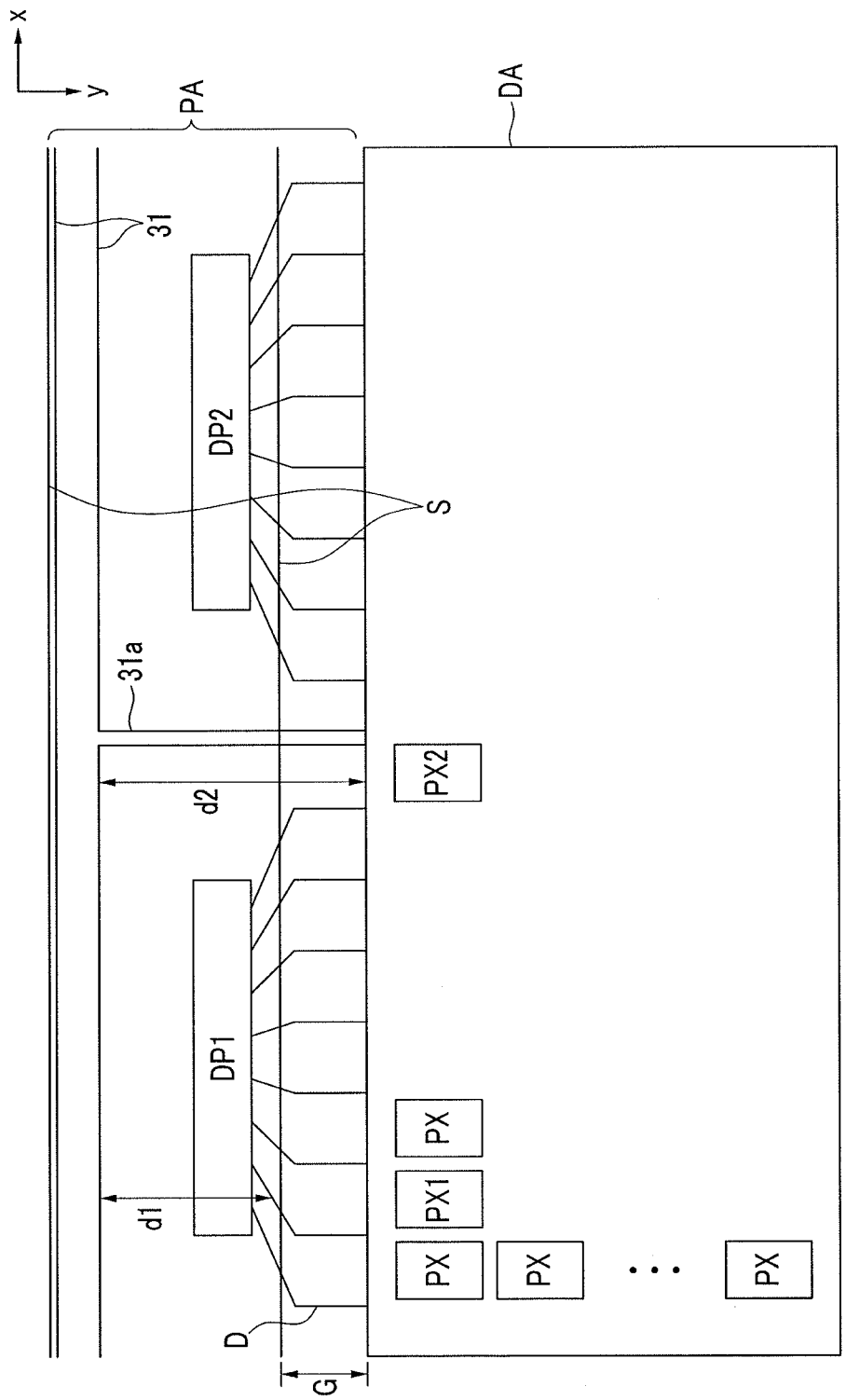
FIG. 1 illustrates a schematic layout view of a liquid crystal display according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawings, the thickness of layers, films, panels, regions, etc., may be exaggerated for clarity. Like reference numerals designate like elements throughout the specification. It will also be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
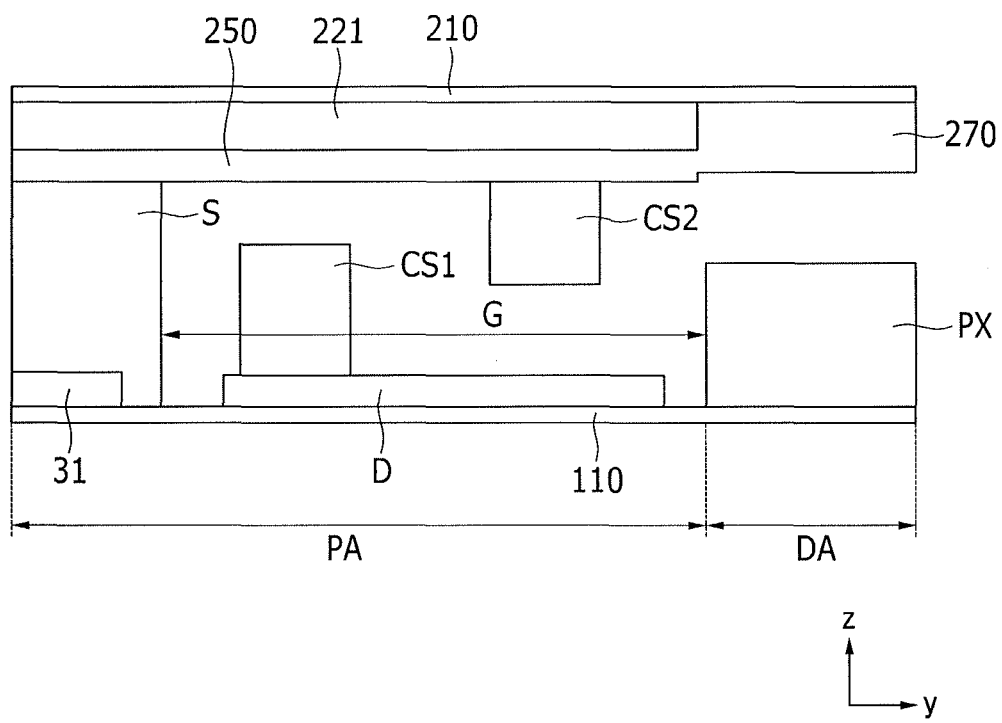
FIG. 2 illustrates a schematic cross-sectional view of a part of the liquid crystal display according to the exemplary embodiment.

Hereinafter, a liquid crystal display according to an exemplary embodiment will be described with reference to the accompanying drawings. First, a liquid crystal display according to an exemplary embodiment will be described with reference to FIGS. 1 and 2. FIG. 1 is a schematic layout view of a liquid crystal display according to an exemplary embodiment, and FIG. 2 is a schematic cross-sectional view illustrating a part of the liquid crystal display according to the exemplary embodiment. It is noted that FIG. 2 is a schematic cross-section independent of FIG. 1, and FIGS. 1 and 2 are not drawn to a same scale.

Referring to FIG. 1, a liquid crystal display according to an exemplary embodiment may include a display area DA and a peripheral area PA disposed around the display area DA. The display area DA is an area in which a plurality of pixels PX is formed to display a desired image. Although not illustrated, a plurality of gate lines and a plurality of data lines, a plurality of switching elements connected to the gate lines and the data lines, and a plurality of pixel electrodes connected to the plurality of switching elements are formed in the display area DA. The detailed structure of the pixels PX will be described in more detail below.

The peripheral area PA may include a first data driving circuit unit DP1 and a second data driving circuit unit DP2 which apply data voltages to the plurality of pixels PX, and a plurality of data driver connecting lines D which connect the data lines of the display area DA with the first and second data driving circuit units DP1 and DP2. Further, a common voltage applying unit 31 for applying a common voltage to a common electrode to be described below is formed in the peripheral area PA. The common voltage applying unit 31 is formed to surround at least a part of the peripheral area PA, and has an extension 31a extended up to the display area DA. For example, the common voltage applying unit 31 may have a linear structure extending along the peripheral area PA in parallel to and spaced apart from the display area DA, e.g., along the x-axis, and the extension 31a may extend perpendicularly to the linear structure of the common voltage applying unit 31, e.g., along the y-axis, to connect the linear structure to the display area DA. The extension 31a is a portion which applies the common voltage to a portion to which the common electrode is applied, such as a storage electrode line disposed in the display area DA.

The liquid crystal display according to the illustrated exemplary embodiment is described to have two data driving circuit units, but this is just one example, and many features of liquid crystal displays according to the exemplary embodiment may be applied to all liquid crystal displays including one or more data driving circuit units.

The common voltage applying unit 31 is covered by a sealant S. In more detail, most of the common voltage applying unit 31 is covered by the sealant S, except for a part of the extension 31a of the common voltage applying unit 31. For example, as illustrated in FIG. 1, the sealant S extends, e.g., continuously, to cover, e.g., completely, the linear structure of the common voltage applying unit 31 and to cover, e.g., only partially, extension 31a, e.g., a portion of the extension 31a adjacent to the linear structure of the common voltage applying unit 31. As further illustrated in FIG. 1, the sealant S covers the data driving circuit units DP1 and DP2 and a part of each of the data driver connecting lines D.

Referring to FIG. 2, the liquid crystal display according to the exemplary embodiment may include a first substrate 110 and a second substrate 210 facing each other, and a liquid crystal layer (not illustrated) interposed between the first and second substrates 110 and 210. A plurality of pixels PX is formed on the first substrate 110 of the display area DA. Although not illustrated, each pixel PX includes a gate line and a data line, a switching element connected to the gate line and the data line, and a pixel electrode connected to the switching element.

A common electrode 270 is formed on the second substrate 210 of the display area DA. The common voltage applying unit 31 and the data driver connecting line D are formed on the first substrate 110 of the peripheral area PA. A first light blocking member 221 is formed on the second substrate 210 of the display area DA, and a conductor layer 250 is formed on the first light blocking member 221.

The first substrate 110 and the second substrate 210 of the peripheral area PA are coupled with each other by the sealant S. The sealant S is formed to cover the common voltage applying unit 31 and a part of the data driver connecting line D, as discussed previously. Most of the common voltage applying unit 31 is sufficiently covered by the sealant S, except for a part of the extension 31a of the common voltage applying unit 31. Further, a first part of the data driver connecting line D is covered by the sealant S, e.g., only portions of the data driver connecting lines D adjacent to the data driving circuit units DP1 and DP2 as illustrated in FIG. 1, while a second part of the data driver connecting line D is uncovered, e.g., portions of the data driver connecting lines D immediately adjacent to the display area DA illustrated in FIG. 1.

A first spacer CS1 is formed on the first substrate 110 of the peripheral area PA, and a second spacer CS2 is formed on the second substrate 210 of the peripheral area PA. The first spacer CS1 is disposed on a part of the data driver connecting line D, e.g., the first spacer CS1 is disposed on a part of the data driver connecting line D exposed by the sealant S.

The first spacer CS1 and the second spacer CS2 are spaced apart from each other, e.g., along the y-axis, so as not to overlap each other. The first spacer CS1 and the second spacer CS2 may be formed as organic layers displaying predetermined colors. The second spacer CS2 and the first spacer CS1 may serve as a dam which prevents a material layer, e.g., an alignment layer coated on the display area DA, from flowing into the peripheral area PA.

In the liquid crystal display according to the exemplary embodiment, most of the common voltage applying unit 31 disposed in the peripheral area PA is covered by the sealant S. Further, a part of the data driver connecting line D is covered by the sealant S. By sufficiently covering the common voltage applying unit 31 by the sealant S and covering a part of the data driver connecting line D by the sealant S and the first spacer CS1, during the initial alignment, an electric effect between outer pixels PX adjacent to the data driving circuit units DP1 and DP2 among the plurality of pixels PX and the common voltage applying unit 31 may be reduced. Accordingly, a difference between electric field intensities, which may be generated according to positions of the outer pixels PX adjacent to the data driving circuit units DP1 and DP2 among the plurality of pixels PX, may be prevented.

Further, a first gap G between the sealant S and the display area DA may be about 460 μm or more. When the first gap G between the sealant S and the display area DA is too small, e.g., smaller than about 460 μm, an impurity included in the sealant S may flow into the liquid crystal layer, thereby affecting the electric field applied to the liquid crystal layer. That is, when the electric field applied to the liquid crystal layer is affected by the impurity, the electric field intensity of a liquid crystal layer of an outer pixel PX in a peripheral area PA and an electric field intensity of a liquid crystal layer of a central pixel PX at a center of the display area DA may be different from each other. Therefore, in the liquid crystal display according to the exemplary embodiment, by forming the first gap G between the sealant S and the display area DA to be about 460 μm or more, potential impurities in the sealant S are prevented from flowing into the liquid crystal layer. As a result, potential impurities in the sealant S may be prevented from affecting the electric field applied to the liquid crystal layer.

Figure 3:
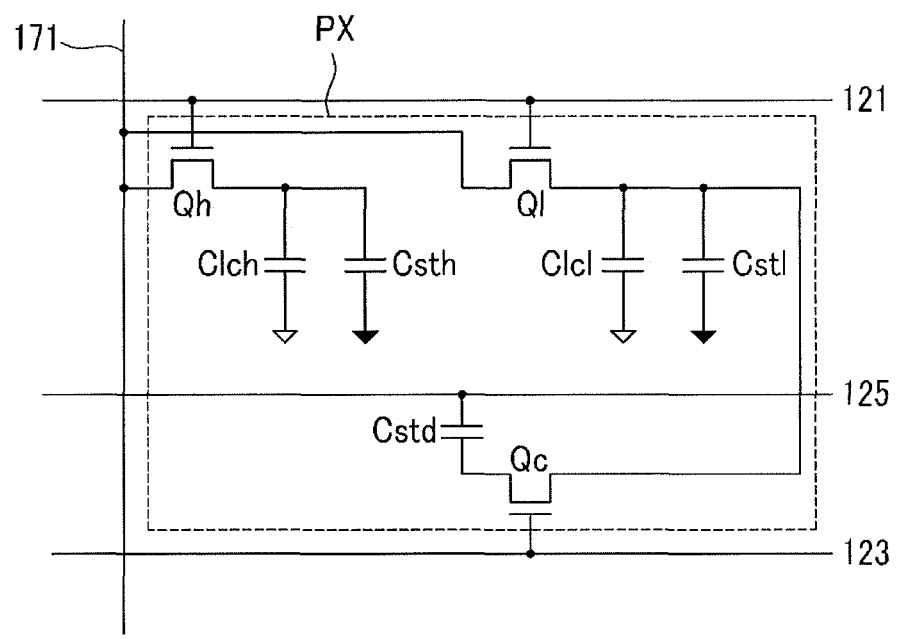
FIG. 3 illustrates an equivalent circuit diagram of one pixel of the liquid crystal display according to the exemplary embodiment.

An exemplary structure of one pixel PX of the liquid crystal display according to the exemplary embodiment will be described in detail hereinafter with reference to FIGS. 3 to 6. FIG. 3 illustrates an equivalent circuit diagram of one pixel of the liquid crystal display according to the exemplary embodiment, FIG. 4 illustrates a layout view of one pixel of the liquid crystal display according to the exemplary embodiment, FIG. 5 illustrates a cross-sectional view along line V-V of FIG. 4, and FIG. 6 illustrates a diagram of a basic structure of the pixel of FIG. 4.

Referring to FIG. 3, the liquid crystal display according to the exemplary embodiment may include signal lines including a gate line 121, a storage electrode line 125, a step-down gate line 123, and a data line 171, and a pixel PX connected to the signal lines. The pixel PX may include first, second, and third switching elements Qh, Ql, and Qc, first and second liquid crystal capacitors Clch and Clcl, first and second storage capacitors Csth and Cstl, and a step-down capacitor Cstd. Herein, the first switching element Qh and the first thin film transistor Qh, the second switching element Ql and the second thin film transistor Ql, and the third switching element Qc and the third thin film transistor Qc are represented by the same reference numerals, respectively.

The first and second switching elements Qh and Ql are connected to the gate line 121 and the data line 171, respectively, and the third switching element Qc is connected to the step-down gate line 123. The first and second switching elements Qh and Ql are three-terminal elements, such as a thin film transistor provided on a lower panel 100, and control terminals thereof are connected to the gate line 121, input terminals are connected to the data line 171, and output terminals are connected to the first and second liquid crystal capacitors Clch and Clcl and the first and second storage capacitors Csth and Cstl, respectively. The third switching element Qc is also a three-terminal element, such as a thin film transistor provided on the lower panel 100, and a control terminal thereof is connected to the step-down gate line 123, an input terminal is connected to the second liquid crystal capacitor Clcl, and an output terminal is connected to the step-down capacitor Cstd.

Figure 4:
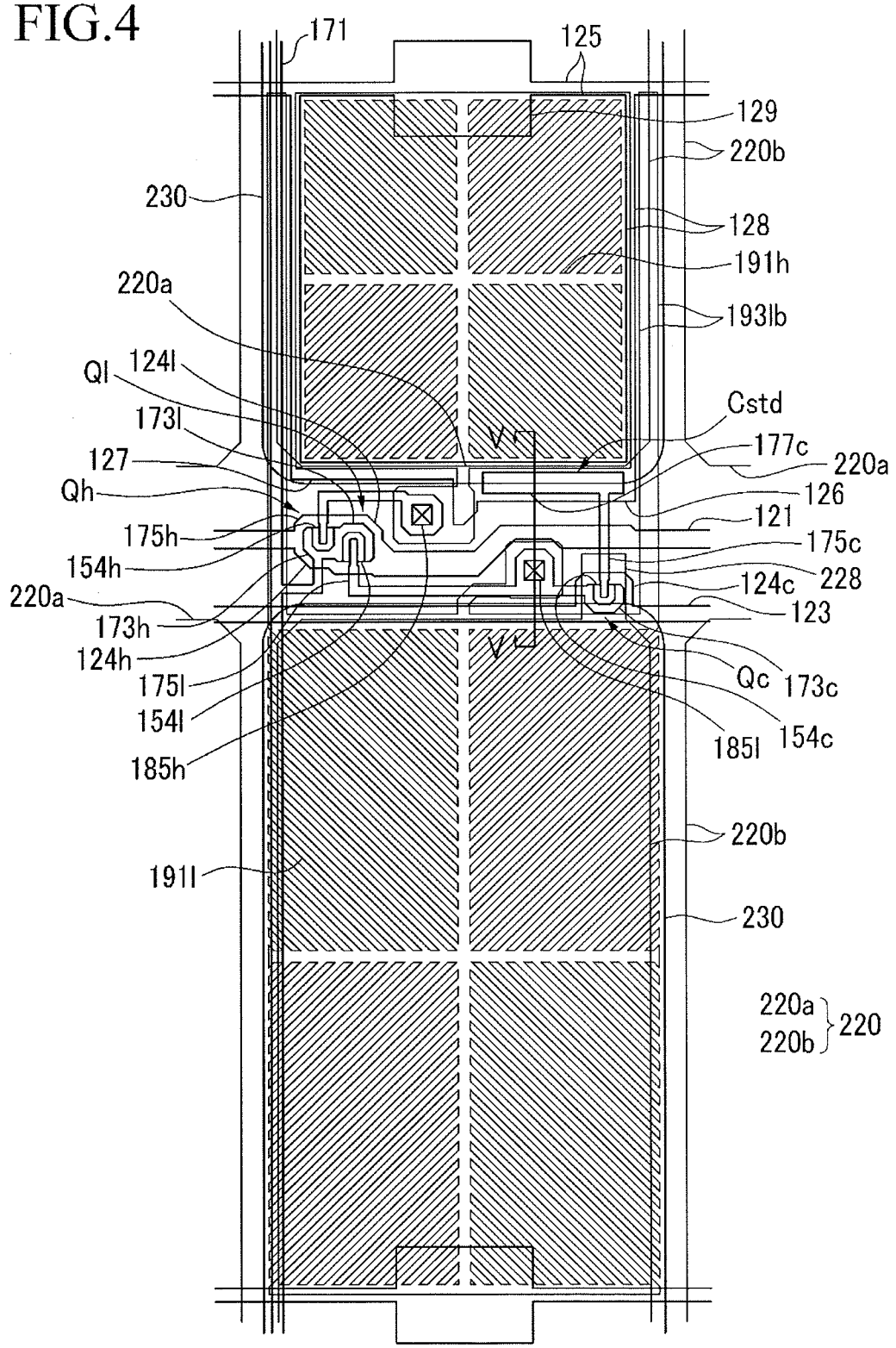
FIG. 4 illustrates a layout view of one pixel of the liquid crystal display according to the exemplary embodiment.
Figure 5:
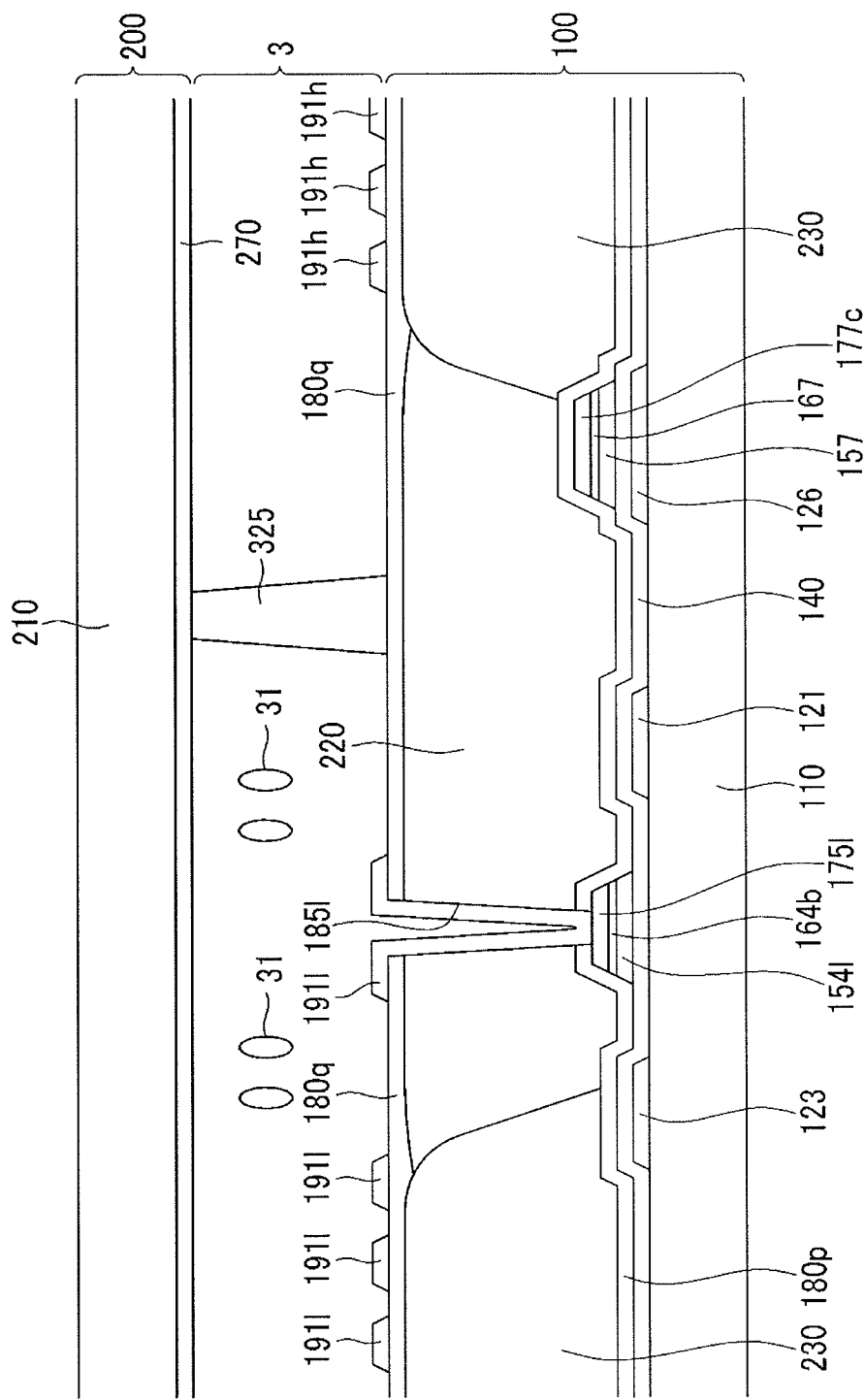
FIG. 5 illustrates a cross-sectional view taken along line V-V of FIG. 4.
Figure 6:
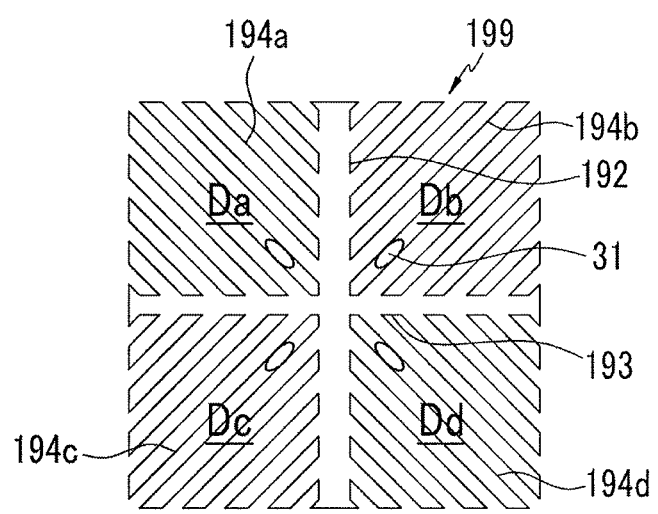
FIG. 6 illustrates a diagram illustrating a basic structure of the pixel of FIG. 4.

The first and second liquid crystal capacitors Clch and Clcl are formed by overlapping first and second subpixel electrodes 191h and 191l connected with the first and second switching elements Qh and Ql with the common electrode 270 of an upper panel 200, as illustrated in FIGS. 4-5. The first and second storage capacitors Csth and Cstl are formed by overlapping the storage electrode line 125 including the storage electrode 129 with the first and second subpixel electrodes 191h and 191l (FIG. 4). The step-down capacitor Cstd is connected to the output terminal of the third switching element Qc and the storage electrode line 125, and formed by overlapping the storage electrode line 125 included in the lower panel 100 with the output terminal of the third switching element Qc with an insulator therebetween.

Referring to FIGS. 4 to 6, a pixel structure of the liquid crystal display illustrated in FIG. 3 will be described in more detail. As described above, the liquid crystal display according to the exemplary embodiment may include the lower panel 100 and the upper panel 200 facing each other, a liquid crystal layer 3 interposed between the lower and upper panels 100 and 200, and a pair of polarizers (not illustrated) attached to outer surfaces of the panels 100 and 200.

First, the lower panel 100 will be described. A plurality of gate conductors including a plurality of gate lines 121, a plurality of step-down gate lines 123, and a plurality of storage electrode lines 125 is formed on the first substrate 110.

The gate line 121 and the step-down gate line 123 mainly extend in a horizontal direction to transfer gate signals. The gate line 121 includes a first gate electrode 124h and a second gate electrode 124l protruding upward and downward, and the step-down gate line 123 includes a third gate electrode 124c protruding upward. The first gate electrode 124h and the second gate electrode 124l are connected with each other to form one protrusion.

The storage electrode line 125 mainly extends in a horizontal direction to transfer a predetermined voltage such as a common voltage Vcom. The storage electrode line 125 includes storage electrodes 129 protruding upward and downward, a pair of vertical portions 128 extending downward to be substantially vertical to the gate line 121, and a horizontal portion 127 connecting ends of the pair of vertical portions 128 with each other. The horizontal portion 127 includes a capacitor electrode 126 expanded downward.

A gate insulating layer 140 is formed on the gate conductor 121, 123, and 125. A plurality of semiconductors 151 which may be made of amorphous or crystalline silicon or the like is formed on the gate insulating layer 140. The semiconductors 151 mainly extend in a vertical direction, and include first and second semiconductors 154h and 154l extending toward the first and second gate electrodes 124h and 124l and connected with each other, and a third semiconductor 154c connected with the second semiconductor 154l. The third semiconductor 154c is extended to form a fourth semiconductor 157.

A plurality of stripe-shaped ohmic contacts (not illustrated) is formed on the semiconductors 151, a first ohmic contact (not illustrated) is formed on the first semiconductor 154h, and a second ohmic contact 164l and a third ohmic contact (not illustrated) are formed on the second semiconductor 154l and the third semiconductor 154c, respectively. The third ohmic contact is extended to form a fourth ohmic contact 167.

Data conductors including a plurality of data lines 171, a plurality of first drain electrodes 175h, a plurality of second drain electrodes 175l, and a plurality of third drain electrodes 175c are formed on the ohmic contacts 164l and 167. The data line 171 transfers a data signal and mainly extends in a vertical direction to cross the gate line 121 and the set-down gate line 123. Each data line 171 extends toward the first gate electrode 124h and the second gate electrode 124l and includes a first source electrode 173h and a second source electrode 173l which are formed in a "W" shape together.

A first drain electrode 175h, a second drain electrode 175l, and a third drain electrode 175c include one wide end portion and the other rod-shaped end portion, respectively. The rod-shaped end portions of the first drain electrode 175h and the second drain electrode 175l are partially surrounded by the first source electrode 173h and the second source electrode 173l. One wide end portion of the second drain electrode 175l is again extended to form a third source electrode 173c which is bent in a 'U'-lettered shape. A wide end portion 177c of the third drain electrode 175c overlaps with the capacitor electrode 126 to form a set-down capacitor Cstd, and the rod-shaped end portion is partially surrounded by the third source electrode 173c.

The first/second/third gate electrodes 124h/124l/124c, the first/second/third source electrodes 173h/173l/173c, and the first/second/third drain electrodes 175h/175l/175c form first/second/third thin film transistors (TFTs) Qh/Ql/Qc together with the first/second/third island-shaped semiconductors 154h/154l/154c, and channels of the thin film transistors are formed in the respective semiconductors 154h/154l/154c between the respective source electrodes 173h/173l/173c and the respective drain electrodes 175h/175l/175c.

The semiconductors 151 have substantially the same plane shape as the data conductors 171, 175h, 175l, and 175c and the ohmic contacts 164l and 167 therebelow, except for channel regions between the source electrodes 173h, 173l, and 173c and the drain electrodes 175h, 175l, and 175c. That is, an exposed portion which is not covered by the data conductors 171, 175h, 175l, and 175c in addition to a space between the source electrodes 173h, 173l, and 173c and the drain electrodes 175h, 175l, and 175c are disposed at the semiconductors 151.

A lower passivation layer 180p made of an inorganic insulator such as silicon nitride or silicon oxide is formed on the data conductors 171, 175h, 175l, and 175c and the exposed semiconductor portions 154h, 154l, and 154c of the semiconductors 151.

A color filter 230 is disposed on the lower passivation layer 180p. The color filter 230 is disposed in most of regions except for a place where the first thin film transistor Qh, the second thin film transistor Ql, and the third thin film transistor Qc are disposed. However, the color filters 230 may be elongated in a vertical direction along a space between the adjacent data lines 171. Each color filter 230 may display one of primary colors such as three primary colors of red, green and blue.

A second light blocking member 220 is disposed on a region where the color filter 230 is not disposed and a part of the color filter 230. The second light blocking member 220 is called a black matrix and blocks light leakage. The light blocking member 220 extends along the gate line 121 and the step-down gate line 123 to be expanded upward and downward, and includes a first portion 220a which covers a region in which the first thin film transistor Qh, the second thin film transistor Ql, and the third thin film transistor Qc are disposed and a second portion 220b which extends along the data line 171. A spacer 325 is formed on the second light blocking member 220. Although not illustrated, the spacer 325 may include a plurality of spacers having different heights. Further, the spacer 325 may be made of a colored photosensitive material including a black pigment and the like, and the colored photosensitive material may have positive photosensitivity and have a characteristic in which a height is largest and then reduced again according to a cross section. Further, the spacer 325 may be formed on the same layer as the second light blocking member 220.

An upper passivation layer 180q is formed on the color filter 230 and the second light blocking member 220. The upper passivation layer 180q may prevent the color filter 230 and the second light blocking member 220 from being lifted, and prevent defects such as an afterimage which may be caused when a screen is driven by suppressing contamination of the liquid crystal layer 3 by an organic material such as a solvent flowing into from the color filter 230.

A plurality of first contact holes 185h and a plurality of second contact holes 185l which expose the wide end portion of the first drain electrode 175h and the wide end portion of the second drain electrode 175l, respectively are formed in the lower passivation layer 180p, the second light blocking member 220, and the upper passivation layer 180q.

A plurality of pixel electrodes 191 is formed on the upper passivation layer 180q. Each pixel electrode 191 includes the first subpixel electrode 191h and the second subpixel electrode 191l which are separated from each other with two gate lines 121 and 123 therebetween and disposed above and below a pixel area based on the gate lines 121 and 123, and the first subpixel electrode 191h and the second subpixel electrode 191l include basic electrodes 199 illustrated in FIG. 6 or one or more modifications thereof, respectively.

The basic electrode 199 will be described in detail with reference to FIG. 6. As illustrated in FIG. 6, an overall shape of the basic electrode 199 is a quadrangle, and includes a cross stem configured by a horizontal stem 193 and a vertical stem 192 perpendicular to the horizontal stem 193. Further, the basic electrode 199 is divided into a first subregion Da, a second subregion Db, a third subregion Dc, and a fourth subregion Dd, and the respective subregions Da-Dd include a plurality of first to fourth minute branches 194a, 194b, 194c, and 194d.

The first minute branch 194a obliquely extends in an upper left direction from the horizontal stem 193 or the vertical stem 192, and the second minute branch 194b obliquely extends in an upper right direction from the horizontal stem 193 or the vertical stem 192. Further, the third minute branch 194c obliquely extends in a lower left direction from the horizontal stem 193 or the vertical stem 192, and the fourth minute branch 194d obliquely extends in a lower right direction from the horizontal stem 193 or the vertical stem 192.

The first to fourth minute branches 194a, 194b, 194c, and 194d may form an angle of approximately 45 degrees or 135 degrees with the gate line 121 or the horizontal stem 193. Further, the minute branches 194a, 194b, 194c, and 194d of two adjacent subregions Da, Db, Dc, and Dd may be perpendicular to each other. Widths of the minute branches 194a, 194b, 194c, and 194d may be 2.5 µm to 5.0 µm, and a distance between the adjacent minute branches 194a, 194b, 194c, and 194d in one of the subregions Da, Db, Dc, and Dd may be 2.5 µm to 5.0 µm.

According to another exemplary embodiment, widths of the minute branches 194a, 194b, 194c, and 194d may be increased toward the horizontal stem 193 or the vertical stem 192, and a difference between the largest portion and the smallest portion of the width of one of the minute branches 194a, 194b, 194c, and 194d may be 0.2 µm to 1.5 µm.

The first subpixel electrode 191h and the second subpixel electrode 191l include outer stems surrounding an outer side, and a vertical portion of the outer stem extends along the data line 171 to prevent a capacitive coupling, that is, coupling between the data line 171 and the first subpixel electrode 191h and the second subpixel electrode 191l. The first subpixel electrode 191h and the second subpixel electrode 191l receive data voltages from the first drain electrode 175h and the second drain electrode 175l through the first contact hole 185h and the second contact hole 185l, respectively. The first subpixel electrode 191h and the second subpixel electrode 191l to which the data voltages are applied generate an electric field together with the common electrode 270 of the upper panel 200 to determine directions of the liquid crystal molecules of the liquid crystal layer 3 between the first subpixel electrode 191h and the second subpixel electrode 191l and the common electrode 270. Luminance of light passing through the liquid crystal layer 3 varies according to the determined directions of the liquid crystal molecules.

Sides of the first to fourth minute branches 194a, 194b, 194c, and 194d distort the electric field to make horizontal components which determine tilt directions of the liquid crystal molecules 31. The horizontal components of the electric field are substantially parallel to the sides of the first to fourth minute branches 194a, 194b, 194c, and 194d. Accordingly, as illustrated in FIG. 5, the liquid crystal molecules 31 are tilted in a parallel direction to length directions of the minute branches 194a, 194b, 194c, and 194d. Since one pixel electrode 191 includes four subregions Da-Dd in which length directions of the minute branches 194a, 194b, 194c, and 194d are different from each other, the tilt directions of the liquid crystal molecules 31 are approximately four, and four domains in which alignment directions of the liquid crystal molecules 31 are different from each other are formed in the liquid crystal layer 3. As such, a reference viewing angle of the liquid crystal display may be increased by varying the tilt directions of the liquid crystal molecules 31.

The first subpixel electrode 191h and the common electrode 270 form a first liquid crystal capacitor Clch together with the liquid crystal layer 3 therebetween, and the second subpixel electrode 191l and the common electrode 270 form a second liquid crystal capacitor Clcl together with the liquid crystal layer 3 therebetween. As a result, even after the first and second thin film transistors Qh and Ql are turned off, the applied voltage is maintained.

The first and second subpixel electrodes 191h and 191l overlap the storage electrode line 125 in addition to the storage electrode 129 to form the first and second storage capacitors Csth and Cstl, and the first and second storage capacitors Csth and Cstl reinforce a voltage storage capacity of the first and second liquid crystal capacitors Clch and Clcl, respectively.

The capacitor electrode 126 and the expansion 177c of the third drain electrode 175c overlap each other with the gate insulating layer 140 and the semiconductor layers 157 and 167 therebetween to form the step-down capacitor Cstd. In another exemplary embodiment, the semiconductor layers 157 and 167 which are disposed between the capacitor electrode 126 and the expansion 177c of the third drain electrode 175c which form the step-down capacitor Cstd may be removed. A lower alignment layer (not illustrated) is formed on the pixel electrode 191 and the exposed upper passivation layer 180q.

Next, the upper panel 200 will be described. The common electrode 270 is formed on a second insulation substrate 210. An upper alignment layer (not illustrated) is formed on the common electrode 270. Polarizers (not illustrated) are provided on outer sides of the two panels 100 and 200, and transmissive axes of the two polarizers are perpendicular to each other, and one transmissive axis thereof may be parallel to the gate line 121.

The liquid crystal layer 3 has negative dielectric anisotropy, and the liquid crystal molecules of the liquid crystal layer 3 are aligned so that long axes thereof are vertical to the surfaces of the two panels 100 and 200 while an electric field is not applied. Accordingly, incident light does not pass through an orthogonal polarizer but is blocked while the electric field is not applied. At least one of the lower alignment layer, the upper alignment layer, and the liquid crystal layer 3 includes a photopolymerizable material.

As describe above, the first subpixel electrode 191h and the second subpixel electrode 191l, to which the data voltages are applied, generate an electric field together with the common electrode 270 of the upper panel 200. As a result, the liquid crystal molecules of the liquid crystal layer 3, which are aligned so as to be vertical to the surfaces of the first substrate 110 and the second substrate 210 while the electric field is not applied, are inclined in a horizontal direction with respect to the surfaces of the first substrate 110 and the second substrate 210 and luminance of light passing through the liquid crystal layer 3 varies depending on an inclined degree of the liquid crystal molecules.

Magnitudes of the voltages applied to the first subpixel electrode 191h and the second subpixel electrode 191l vary according to the step-down capacitor, and the voltage of the first subpixel electrode 191h having a relatively small area may be higher than the voltage of the second subpixel electrode 191l having a relatively large area. As such, when the voltages of the first subpixel electrode 191h and the second subpixel electrode 191l are different from each other, voltages applied to the liquid crystal capacitors Clch and Clcl formed in the two pixel electrodes 191h and 191l are different from each other, and thus, tilt angles of the liquid crystal molecules of each subpixel PXa or PXb are different from each other. Accordingly, when the voltages applied to the first subpixel electrode 191h and the second subpixel electrode 191*l* are appropriately adjusted, an image viewed from the side may be maximally close to an image viewed from the front, and as a result, side visibility may be improved.

The pixel PX of the liquid crystal display according to the exemplary embodiment is described to include the step-down capacitor Cstd and two subpixel electrodes 191*h* and 191*l*. However, the pixel structure according to the exemplary embodiment is just an exemplary embodiment and many features may be applied to all the liquid crystal displays including a pixel electrode having a similar shape to the basic electrode illustrated in FIG. 6.

Figure 7:
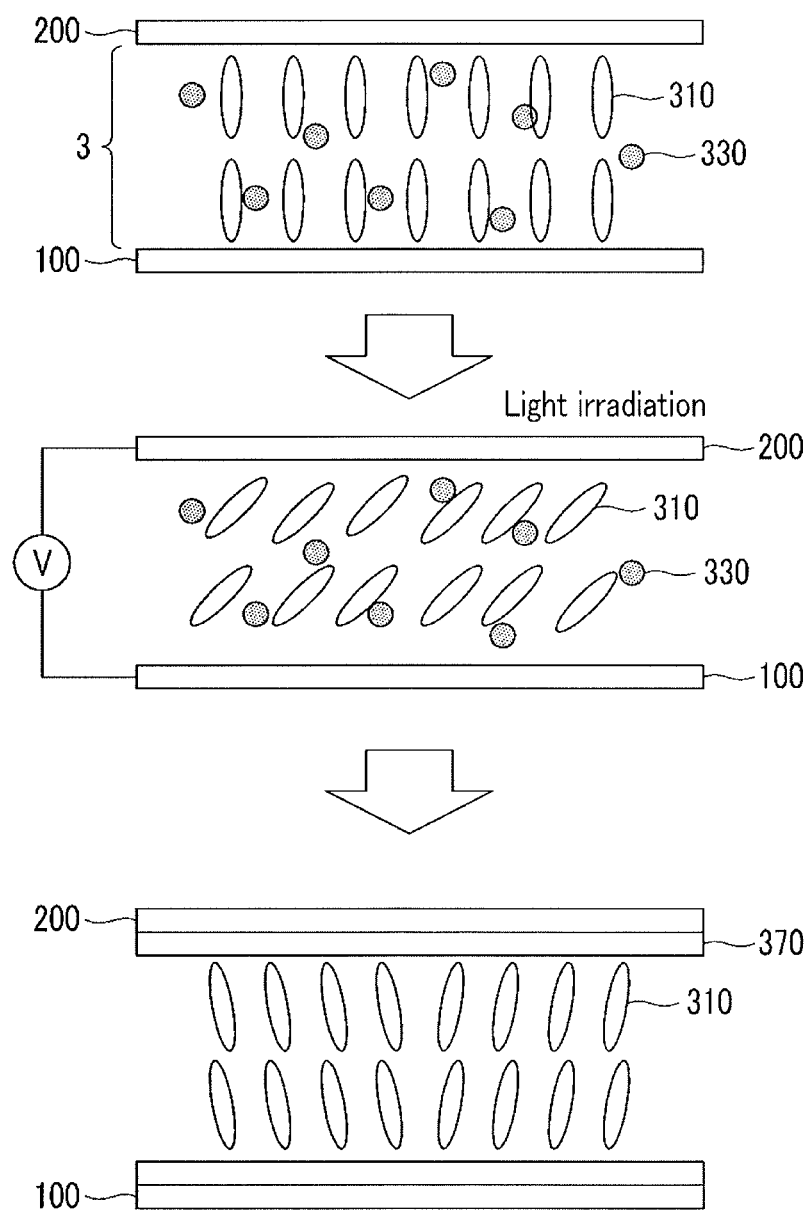
FIG. 7 illustrates a process flow diagram of stages in an alignment process of liquid crystal molecules to have pre-tilts by using pre-polymers polymerized by light.

As described previously, the liquid crystal display according to the exemplary embodiment may include the liquid crystal layer interposed between the two panels 100 and 200, and the liquid crystal layer is initially aligned to have a pre-tilt. An initial alignment method of the liquid crystal molecules in the liquid crystal layer will be described with reference to FIGS. 1, 2, and 7. FIG. 7 illustrates a flow chard of stages in a process of aligning liquid crystal molecules to have pre-tilts by using prepolymers polymerized by light, e.g., ultraviolet light.

First, a prepolymer 330, e.g., monomers cured by polymerization by light, e.g., ultraviolet light, is injected between the two panels 100 and 200. In detail, the prepolymer 330 included in a liquid crystal material may be injected or the prepolymer 330 may be coated when the lower alignment layer and the upper alignment layer are coated. The prepolymer 330 may be reactive mesogens polymerized by light, e.g., ultraviolet light.

Next, data voltages are applied to the first and second subpixel electrodes 191*h* and 191*l* by applying voltages to the gate line and the data line formed on the lower panel 100. Then, an electric field is generated in the liquid crystal layer 3 between the two panels 100 and 200 by applying a common voltage to the common electrode of the upper panel 200.

In this case, the data voltage is applied to the data line connected to each pixel PX of the display area DA through the plurality of data driver connecting lines D in the first and second data driving circuit units DP1 and DP2 of the peripheral area PA. Further, the common voltage applied to the common voltage applying unit 31 formed on the first substrate 110 of the peripheral area PA is transferred to the common electrode 270 of the display area DA through the conductor layer 250 of the second substrate 210 of the peripheral area PA and through a conductor included in the sealant S. As such, when an electric field is generated in the liquid crystal layer 3 between the two panels 100 and 200 of the display area DA, the liquid crystal molecules 310 of the liquid crystal layer 3 are tilted in a direction parallel to the length direction of the minute branches 194*a*-194*d* in response to the electric field through two steps as described above, and the tilt directions of the liquid crystal molecules 310 become a total of four in one pixel PX.

When the electric field is generated in the liquid crystal layer 3 and then light, e.g., ultraviolet light, is irradiated, the prepolymer 330 is polymerized to form a polymer 370, as illustrated in FIG. 7. The polymer 370 may be formed on the lower alignment layer and the upper alignment layer of the panels 100 and 200, respectively, or formed to be in contact with the panels 100 and 200. The alignment directions of the liquid crystal molecules 310 are determined by the polymer 370 so as to have pre-tilts in the length directions of the minute branches 194*a*-194*d*. Accordingly, even in a state where the voltages are not applied to the pixel electrode and the common electrode 270, the liquid crystal molecules 310 are aligned so as to have pre-tilts in four different directions.

Next, a magnitude of the electric field applied to the liquid crystal layer 3 will be described with reference to FIGS. 1 and 2 together with FIG. 7.

Referring to FIG. 1, a first distance d1 between the data driver connecting line D and the common voltage applying unit 31, which are adjacent to the first pixel PX1 among the plurality of outer pixels PX disposed in a first row which is adjacent to the data driving circuit units DP1 and DP2 in the plurality of pixels PX formed in the display area DA, is different from a second distance d2 between the data driver connecting line D and the common voltage applying unit 31, which are adjacent to the second pixel PX2 among the plurality of outer pixels PX disposed in the first row. In more detail, the second distance d2 is different from the first distance d1, i.e., the second distance d2 is larger than the first distance d1.

During the initial alignment, capacitive coupling may be formed between the data driver connecting line D, to which the data voltage is applied, and the common voltage applying unit 31, to which the common voltage is applied. That is, coupling (capacitive coupling) may occur. A size of the coupling varies according to a distance between the data driver connecting line D and the common voltage applying unit 31. That is, a size of the coupling between the data driver connecting line D and the common voltage applying unit 31, to which the common voltage is applied, is increased as the distance between the data driver connecting line D and the common voltage applying unit 31 is decreased.

The coupling varies according to a position of the plurality of outer pixels PX disposed in the first row, i.e., pixels PX in a row immediately adjacent to and extending along the data driving circuit units DP1 and DP2. As described above, the second distance d2, i.e., a distance between the data driver connecting line D and the common voltage applying unit 31 adjacent to the second pixel PX2, is different from the first distance d1, i.e., a distance between the data driver connecting line D and the common voltage applying unit 31 adjacent to the first pixel PX1, and the second distance d2 is larger than the first distance d1.

Accordingly, a size of the coupling which affects the magnitude of the electric field applied to the liquid crystal layer of the first pixel PX1 may be larger than the size of the coupling which affects the magnitude of the electric field applied to the liquid crystal layer of the second pixel PX2. Therefore, the intensities of the electric fields applied to the liquid crystal layers of the first pixel PX1 and the second pixel PX2 may be different from each other, and as a result, during the initial alignment process, pre-tilt angles of the liquid crystal layers of the first pixel PX1 and the second pixel PX2 may be different from each other.

However, in the liquid crystal display according to the exemplary embodiment, the common voltage applying unit 31 and a part of the data driver connecting line D are covered by a sealant S. Further, the first spacer CS1 is disposed on and covers at least a part of the data driver connecting line D.

Accordingly, an electric effect which may be formed due to the common voltage applied to the common voltage applying unit 31 and the data driver connecting line D may be prevented. Therefore, coupling between the common voltage applying unit 31 and the data driver connecting line D may be prevented, and as a result, a change in magnitude of the electric field applied to the liquid crystal layer of the plurality of outer pixels PX in the first row, which are adjacent to the data driving circuit units DP1 and DP2, among the plurality of pixels PX may be removed.

Therefore, by preventing a change in intensity of the electric field of the liquid crystal layer according to a position of the plurality of pixels PX, during the initial alignment, a difference between pre-tilt angles which may occur according to a position of the plurality of pixels PX may be prevented. As a result, deterioration of display quality, e.g., light leakage due to position of the plurality of pixels PX, may be prevented.

Figure 8:
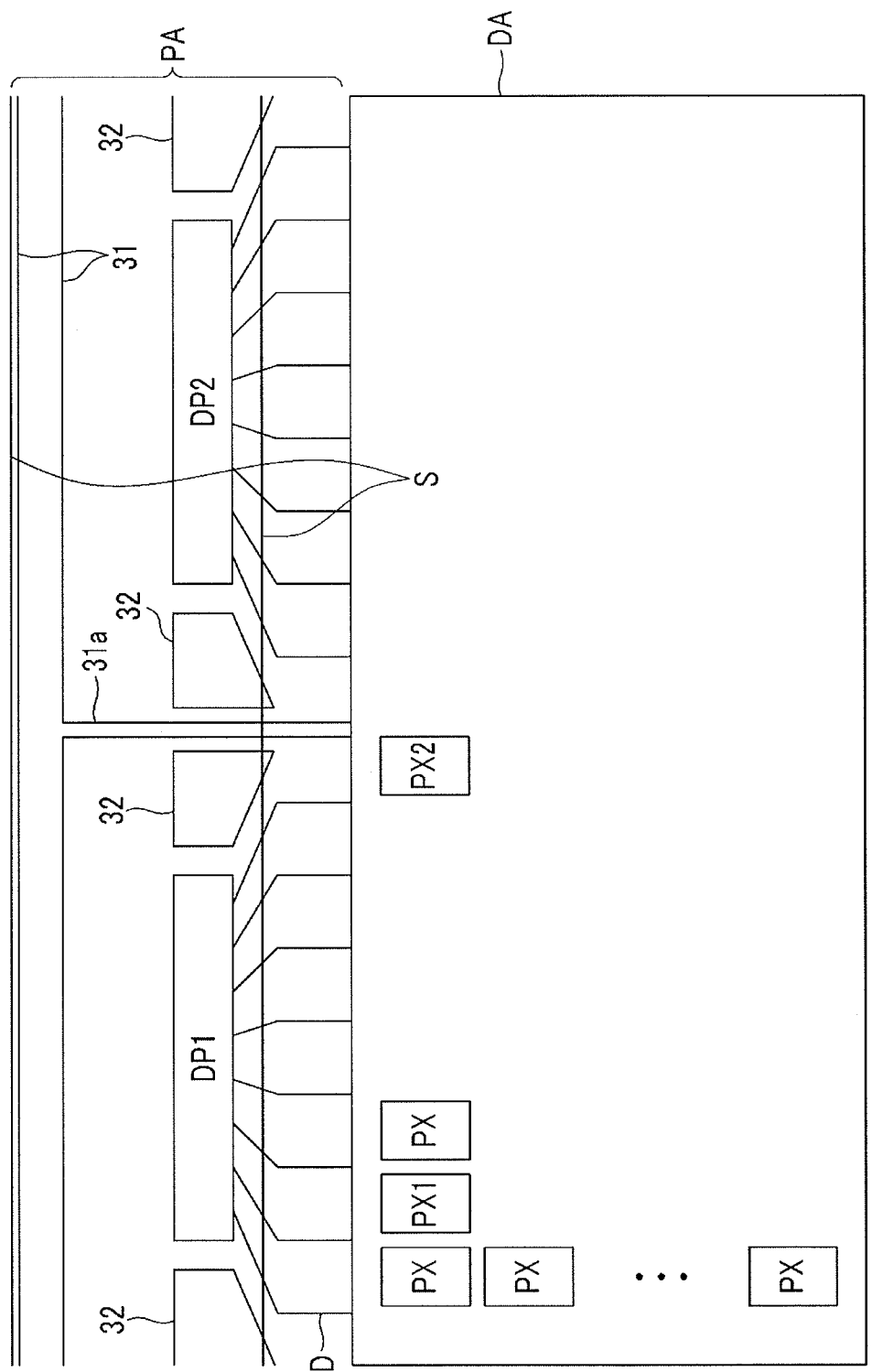
FIG. 8 illustrates a schematic cross-sectional view of a liquid crystal display according to another exemplary embodiment.

A liquid crystal display according to another exemplary embodiment will be described with reference to FIGS. 8 and 9. FIG. 8 is a schematic layout view of a liquid crystal display according to another exemplary embodiment, and FIG. 9 is a schematic, partial cross-sectional view of the liquid crystal display according to the another exemplary embodiment.

Figure 9:
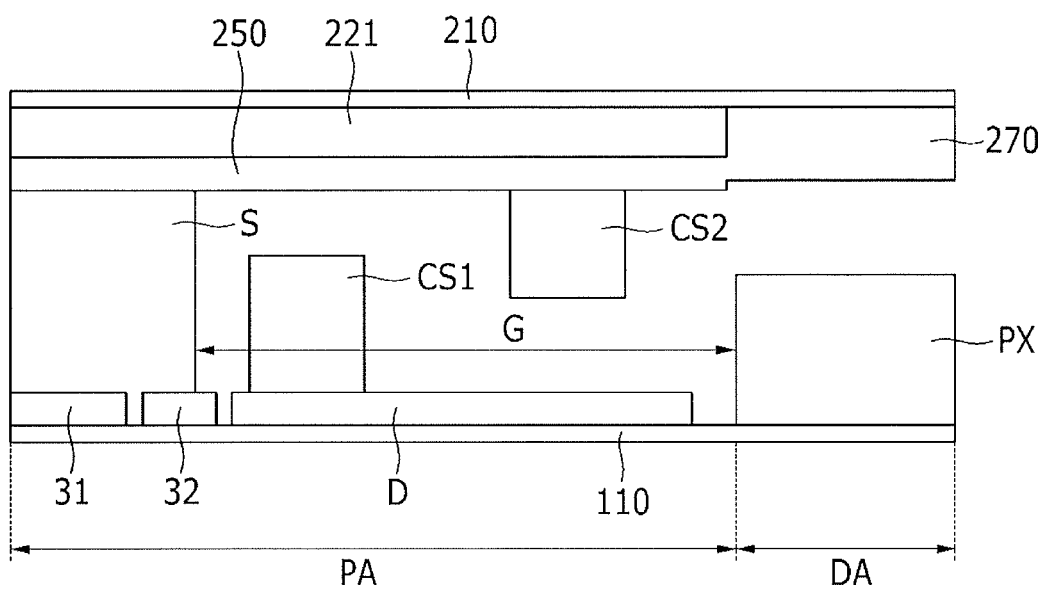
FIG. 9 illustrates a schematic cross-sectional view of a part of the liquid crystal display according to another exemplary embodiment.

Referring to FIGS. 8 and 9, a plurality of pixels PX is formed in the display area DA, and a first data driving circuit unit DP1 and a second data driving circuit unit DP2, and a plurality of data driver connecting lines D which connects the data lines of the display area DA with the first and second data driving circuit units DP1 and DP2 are formed in the peripheral area PA. Further, a common voltage applying unit 31 is formed in the peripheral area PA. The common voltage applying unit 31 is formed to surround at least a part of the peripheral area PA, and has an extension 31a extended up to the display area DA. The extension 31a is a portion to which the common electrode is applied, such as a storage electrode line disposed in the display area DA. The common voltage applying unit 31 and a part of each of the plurality of data driver connecting lines D are covered by the sealant S.

Referring to FIG. 9, the liquid crystal display according to the exemplary embodiment may include a first substrate 110 and a second substrate 210 facing each other, and a liquid crystal layer (not illustrated) interposed between the two substrates 110 and 210. The plurality of pixels PX is formed on the first substrate 110 of the display area DA, and the common electrode 270 is formed on the second substrate 210 of the display area DA.

The common voltage applying unit 31 and the data driver connecting line D are formed on the first substrate 110 of the peripheral area PA. A first light blocking member 221 is formed on the second substrate 210 of the peripheral area PA, and a conductor layer 250 is formed on the first light blocking member 221. The first substrate 110 and the second substrate 210 of the peripheral area PA are coupled with each other by the sealant S. The sealant S is formed to cover the common voltage applying unit 31 and a part of the data driver connecting line D.

A first spacer CS1 is formed on the first substrate 110 of the peripheral area PA, and a second spacer CS2 is formed on the second substrate 210 of the peripheral area PA. A part of the data driver connecting line D is covered by the first spacer CS1. The second spacer CS2 and the first spacer CS1 may serve as a dam which prevents a material layer, e.g., an alignment layer coated on the display area DA, from flowing into the peripheral area PA.

In the liquid crystal display according to the exemplary embodiment, the common voltage applying unit 31 and the part of the data driver connecting line D disposed in the peripheral area are covered by the sealant S. By sufficiently covering the common voltage applying unit 31 by the sealant S, during the initial alignment, an electric effect between outer pixels PX adjacent to the data driving circuit units DP1 and DP2 among the plurality of pixels PX and the common voltage applying unit 31 may be reduced. Accordingly, a difference between electric field intensities which may be generated according to positions of the outer pixels PX adjacent to the data driving circuit units DP1 and DP2 among the plurality of pixels PX may be prevented.

However, in the liquid crystal display according to the exemplary embodiment, unlike the liquid crystal display according to the exemplary embodiment illustrated in FIGS. 1 and 2, an auxiliary conductor 32 is formed on the first substrate 110 of the peripheral area PA. The auxiliary conductor 32 is disposed at a portion where the data driver connecting line D is not formed. Accordingly, by compensating for a step difference between a portion where the data driver connecting line D is formed and other portions, a height of the first spacer CS1 formed on the first substrate 110 is uniformly formed.

As illustrated in FIG. 8, the sealant S is formed to cover at least a part of the auxiliary conductor 32 as well as the common voltage applying unit 31 and the part of the data driver connecting line D.

The floated auxiliary conductor 32 may be capacitively coupled with the common voltage applying unit 31 or the data driver connecting line D, and as a result, an intensity of the electric field applied to the liquid crystal layer may be changed according to a position of the plurality of pixels PX. However, in the liquid crystal display according to the exemplary embodiment, by covering at least a part of the auxiliary conductor 32 by the sealant S, during the initial alignment, an electric effect between the outer pixels PX adjacent to the data driving circuit units DP1 and DP2 among the plurality of pixels PX and the auxiliary conductor 32 may be prevented. Accordingly, a difference between electric field intensities which may be generated according to positions of the outer pixels PX adjacent to the data driving circuit units DP1 and DP2 among the plurality of pixels PX may be prevented.

Many features of the liquid crystal display according to the exemplary embodiment described with reference to FIGS. 3 to 7 in addition to FIGS. 1 and 2 may all be applied to the liquid crystal display according to the exemplary embodiment.

Figure 10:
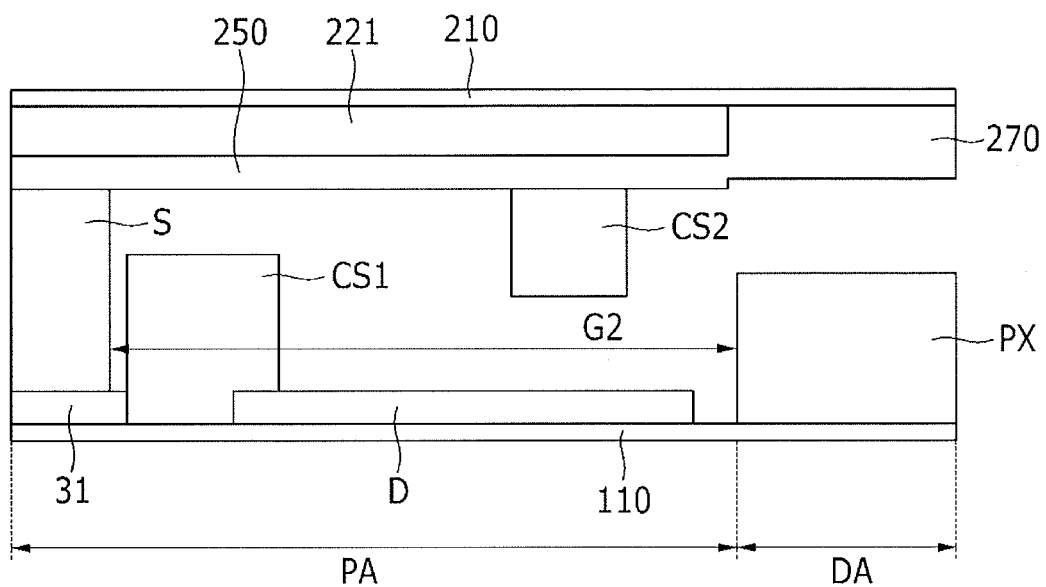
FIG. 10 illustrates a schematic cross-sectional view of a part of the liquid crystal display according to another exemplary embodiment.

A liquid crystal display according to yet another exemplary will be described with reference to FIG. 10. FIG. 10 is a schematic cross-sectional view of a part of the liquid crystal display according to yet another exemplary embodiment.

Referring to FIG. 10, the liquid crystal display according to the exemplary embodiment may include the first substrate 110 and the second substrate 210 facing each other, and a liquid crystal layer (not illustrated) interposed between the two substrates 110 and 210. The plurality of pixels PX is formed on the display area DA of the first substrate 110, and the common electrode 270 is formed on the display area DA of the second substrate 210.

The common voltage applying unit 31 and the data driver connecting line D are formed on the peripheral area PA of the first substrate 110, a first light blocking member 221 is formed on the peripheral area PA of the second substrate 210, and a conductor layer 250 is formed on the first light blocking member 221. The first substrate 110 and the second substrate 210 are coupled with each other by the sealant S in the peripheral area PA. The sealant S is formed to cover at least a part of the common voltage applying unit 31.

The first spacer CS1 is formed on the first substrate 110 of the peripheral area PA, and the second spacer CS2 is formed on the second substrate 210 of the peripheral area PA. The first spacer CS1 of the peripheral area PA is formed to cover the part of the common voltage applying unit 31 and the part of the data driver connecting line D. The second spacer CS2 and the first spacer CS1 may serve as a dam which prevents a material layer such as an alignment layer coated on the display area DA from flowing into the peripheral area PA.

In the liquid crystal display according to the exemplary embodiment, most of the common voltage applying unit 31 disposed in the peripheral area is covered by the first spacer CS1 in addition to the sealant S. By sufficiently covering the common voltage applying unit 31 by the sealant S and the first spacer CS1, during the initial alignment, an electric effect between outer pixels PX adjacent to the data driving circuit units DP1 and DP2 among the plurality of pixels PX and the common voltage applying unit 31 may be reduced. Accordingly, a difference between electric field intensities which may be generated according to positions of the outer pixels PX adjacent to the data driving circuit units DP1 and DP2 among the plurality of pixels PX may be prevented.

Many features of the liquid crystal display according to the exemplary embodiment described above with reference to FIGS. 3 to 7 in addition to FIGS. 1 and 2 and the liquid crystal display according to the exemplary embodiment described above with reference to FIGS. 8 and 9 may all be applied to the liquid crystal display according to the exemplary embodiment.

Figure 11:
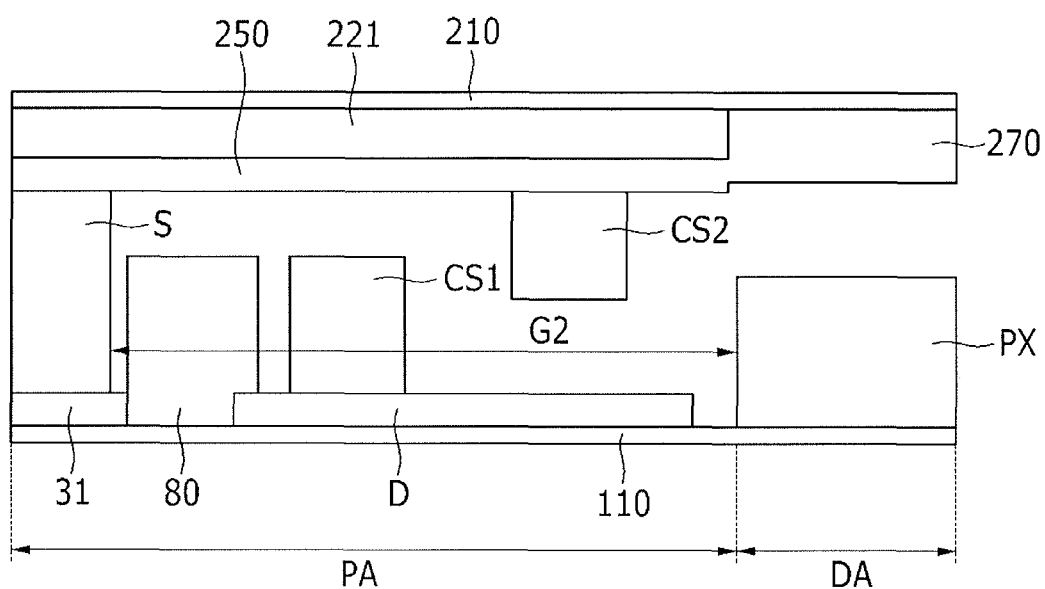
FIG. 11 illustrates a schematic cross-sectional view of a part of the liquid crystal display according to another exemplary embodiment.

A liquid crystal display according to yet another exemplary embodiment will be described with reference to FIG. 11. FIG. 11 illustrates a schematic cross-sectional view of a part of the liquid crystal display device according to yet another exemplary embodiment.

Referring to FIG. 11, the liquid crystal display according to the exemplary embodiment may include a first substrate 110 and a second substrate 210 facing each other, and a liquid crystal layer (not illustrated) interposed between the two substrates 110 and 210. The plurality of pixels PX is formed on the display area DA of the first substrate 110, and the common electrode 270 is formed on the display area DA of the second substrate 210.

The common voltage applying unit 31 and the data driver connecting line D are formed on the peripheral area PA of the first substrate 110, a first light blocking member 221 is formed on the peripheral area PA of the second substrate 210, and a conductor layer 250 is formed on the first light blocking member 221. The first substrate 110 and the second substrate 210 are coupled with each other by the sealant S in the peripheral area PA.

The sealant S is formed to cover at least a part of the common voltage applying unit 31. The first spacer CS1 is formed on the first substrate 110 of the peripheral area PA, and the second spacer CS2 is formed on the second substrate 210 of the peripheral area PA. The second spacer CS2 and the first spacer CS1 may serve as a dam which prevents a material layer such as an alignment layer coated on the display area DA from flowing into the peripheral area PA.

The liquid crystal display according to the exemplary embodiment further includes an organic layer 80 disposed between the sealant S and the first spacer CS1. The organic layer 80 is formed to cover a part of the common voltage applying unit 31 and a part of the data driver connecting line D. The organic layer 80 may include an organic material displaying a predetermined color.

As such, in the liquid crystal display according to the exemplary embodiment, most of the common voltage applying unit 31 disposed in the peripheral area is covered by the sealant S and the organic layer 80, and a part of the data driver connecting line D is covered by the organic layer 80. By sufficiently covering the common voltage applying unit 31 by the sealant S and the organic layer 80, during the initial alignment, an electric effect between the outer pixels PX adjacent to the data driving circuit units DP1 and DP2 among the plurality of pixels PX and the common voltage applying unit 31 may be reduced. Accordingly, a difference between electric field intensities which may be generated according to positions of the outer pixels PX adjacent to the data driving circuit units DP1 and DP2 among the plurality of pixels PX may be prevented.

Many features of the liquid crystal display according to the exemplary embodiment described above with reference to FIGS. 3 to 7 in addition to FIGS. 1 and 2 and the liquid crystal display according to the exemplary embodiment described above with reference to FIGS. 8 and 9 may all be applied to the liquid crystal display according to the exemplary embodiment.

Figure 12:
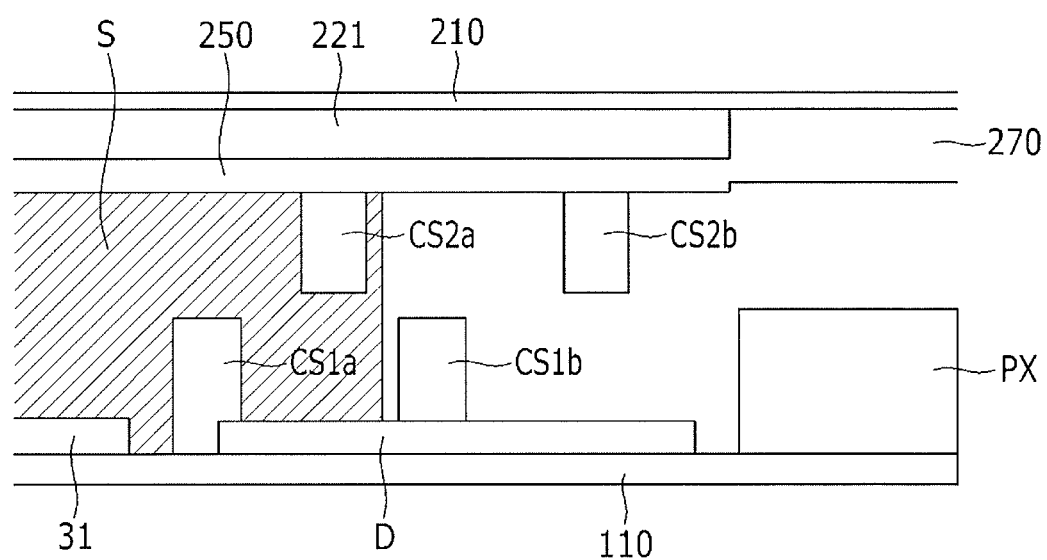
FIG. 12 illustrates a schematic cross-sectional view of a liquid crystal display according to another exemplary embodiment.

A liquid crystal display according to another exemplary embodiment will be described with reference to FIG. 12. FIG. 12 is a schematic cross-sectional view of a liquid crystal display according to another exemplary embodiment.

Referring to FIG. 12, the liquid crystal display according to the exemplary embodiment may include the first substrate 110 and the second substrate 210 facing each other, and a liquid crystal layer (not illustrated) interposed between the two substrates 110 and 210. The plurality of pixels PX is formed on the first substrate 110, and the common electrode 270 is formed on the second substrate 210.

The common voltage applying unit 31 and the data driver connecting line D are formed on the first substrate 110, a first light blocking member 221 is formed on the second substrate 210, and a conductor layer 250 is formed on the first light blocking member 221. The first substrate 110 and the second substrate 210 are coupled with each other by the sealant S in the peripheral area PA.

A third spacer CS1a and a fourth spacer CS1b are formed on the peripheral area PA of the first substrate 110, and a fifth spacer CS2a and a sixth spacer CS2b are formed on the peripheral area PA of the second substrate 210. The third spacer CS1a, the fifth spacer CS2a, the fourth spacer CS1b, and the sixth spacer CS2b are sequentially disposed. The third spacer CS1a, the fifth spacer CS2a, the fourth spacer CS1b and the sixth spacer CS2b may serve as a dam which prevents a material layer such as an alignment layer coated on the display area DA from flowing into the peripheral area PA.

In the liquid crystal display according to the exemplary embodiment, the sealant S is formed to cover a part of the data driver connecting line D, the third spacer CS1a, and the fourth spacer CS1b, in addition to the common voltage applying unit 31. In the liquid crystal display according to the exemplary embodiment, the common voltage applying unit 31 disposed in the peripheral area and the part of the data driver connecting line D are covered by the sealant S. By covering the common voltage applying unit 31 and the part of the data driver connecting line D by the sealant S, during the initial alignment, an electric effect between the outer pixels PX adjacent to the data driving circuit units DP1 and DP2 among the plurality of pixels PX, the common voltage applying unit 31, and the data driver connecting line D may be reduced. Accordingly, a difference between electric field intensities which may be generated according to positions of the outer pixels PX adjacent to the data driving circuit units DP1 and DP2 among the plurality of pixels PX may be prevented.

Many features of the liquid crystal display according to the exemplary embodiment described above with reference to FIGS. 3 to 7 in addition to FIGS. 1 and 2 and the liquid crystal display according to the exemplary embodiment described above with reference to FIGS. 8 and 9 may all be applied to the liquid crystal display according to the exemplary embodiment.

Figure 13:
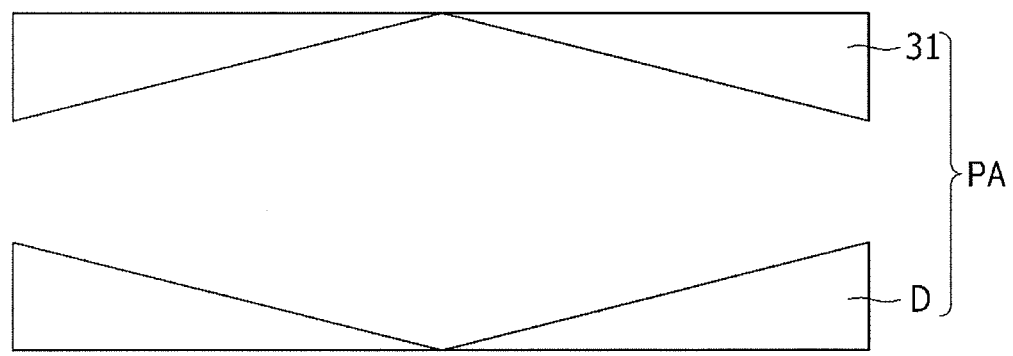
FIG. 13 illustrates a schematic cross-sectional view of the liquid crystal display according to another exemplary embodiment.

A liquid crystal display according to another exemplary embodiment will be described with reference to FIG. 13. FIG. 13 is a schematic cross-sectional view of a liquid crystal display according to another exemplary embodiment.

Referring to FIG. 13, in the case of the liquid crystal display according to the exemplary embodiment, the plane shape of the common voltage applying unit 31 is changed so as to make a distance between the data driver connecting line D and the common voltage applying unit 31 as large as possible. Although not illustrated, the sealant of the liquid crystal display according to the exemplary embodiment is formed to cover the common voltage applying unit 31.

By making the distance between the data driver connecting line D and the common voltage applying unit 31 as large as possible, during the initial alignment, an electric effect between the outer pixels PX adjacent to the data driving circuit units DP1 and DP2 among the plurality of pixels PX, the common voltage applying unit 31, and the data driver connecting line D may be reduced. Accordingly, a difference between electric field intensities which may be generated according to positions of the outer pixels PX adjacent to the data driving circuit units DP1 and DP2 among the plurality of pixels PX may be prevented.

Many features of the liquid crystal display according to the exemplary embodiment described above with reference to FIGS. 3 to 7 in addition to FIGS. 1 and 2, the liquid crystal display according to the exemplary embodiment described above with reference to FIGS. 8 and 9, and the liquid crystal display according to the exemplary embodiment described above with reference to FIGS. 10 to 12 may all be applied to the liquid crystal display according to the exemplary embodiment.

In general, among the plurality of pixels formed in the display area, the outer pixels of the display area, which are disposed to be adjacent to the data driver, an intensity of an electric field applied to the liquid crystal layer during an exposure process may be differently changed from an intensity of an electric field of the plurality of pixels disposed at other portions of the pixel area, by unnecessary capacitive coupling formed between a conductor disposed between the common voltage applying unit and the outer pixel and the common voltage applying unit. As such, during the initial alignment process, when the intensities of the electric fields applied to the liquid crystal layers of some pixels are changed, pre-tilt angles of the liquid crystal molecules of some pixels are different from each other, and non-uniformity of the pre-tilt angles causes deterioration of display quality, e.g., light leakage, in the outer pixels of the display area Therefore, according to the exemplary embodiments, a sealant covers most of the common voltage applying unit and a part of the data driver connecting line in the peripheral area. Accordingly, during the initial alignment, an electric effect between outer pixels and the common voltage applying unit may be reduced, thereby preventing a difference between corresponding electric field intensities. Therefore, it is possible to prevent deterioration of display quality, e.g., light leakage, which may occur in outer pixels of a display area by preventing a change in intensity of an electric field applied to a liquid crystal layer of a plurality of pixels during an initial alignment process to prevent pre-tilt angles of liquid crystal molecules of some pixels from being changed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A liquid crystal display, comprising:
   a first substrate and a second substrate facing each other, the first and second substrates including facing display areas and facing peripheral areas around the display areas;
   a plurality of pixels on the display area of the first substrate;
   a common voltage applying unit on the peripheral area of the first substrate;
   a data driving circuit unit on the peripheral area of the first substrate;
   an electrically floating conductor on the peripheral area of the first substrate, the electrically floating conductor being between the common voltage applying unit and the display area;
   a data driver connecting line on the peripheral area of the first substrate, the data driver connecting line being positioned between the common voltage applying unit and the display area of the first substrate, and connecting the data driving circuit unit and a data line in the display area; and
   a sealant between the facing peripheral areas of the first and second substrates, the sealant covering the common voltage applying unit,
   wherein the electrically floating conductor at least partially overlaps the sealant in a direction perpendicular to an upper surface of the first substrate.

2. The liquid crystal display as claimed in claim 1, further comprising a first spacer on the peripheral area of the first substrate, the first spacer being on a part of the data driver connecting line.

3. The liquid crystal display as claimed in claim 2, further comprising a second spacer on the peripheral area of the second substrate, the first and second spacers having non-overlapping relationship.

4. The liquid crystal display as claimed in claim 3, wherein the sealant overlaps at least one of the first spacer and the second spacer.

5. The liquid crystal display as claimed in claim 1, wherein:
   the plurality of pixels includes a plurality of pixel electrodes, and
   a common electrode is positioned on the display area of the second substrate.

6. The liquid crystal display as claimed in claim 5, wherein the common electrode is electrically connected with the common voltage applying unit.

7. The liquid crystal display as claimed in claim 1, further comprising:
   a lower alignment layer on the display area of the first substrate;

an upper alignment layer on the display area of the second substrate; and a liquid crystal layer between the first substrate and the second substrate, at least one of the lower alignment layer, the upper alignment layer, and the liquid crystal layer including a polymerizable material.

8. The liquid crystal display as claimed in claim 1, the sealant covers a part of the data driver connecting line.

\* \* \* \* \*